(12) United States Patent
Frank et al.

(10) Patent No.: US 7,885,784 B2
(45) Date of Patent: Feb. 8, 2011

(54) OBJECT-TRACKING AND SITUATION-ANALYSIS SYSTEM

(76) Inventors: Margit Frank, Bautzener Strasse 17, Berlin (DE) 10829; Lars Maria Schnatmann, Neptunplatz 6 A, Cologne (DE) 50823

( * ) Notice: Subject to any disclaimer, the term of this patent is extended or adjusted under 35 U.S.C. 154(b) by 304 days.

(21) Appl. No.: 11/908,900

(22) PCT Filed: Mar. 20, 2006

(86) PCT No.: PCT/EP2006/002740

§ 371 (c)(1),
(2), (4) Date: May 27, 2008

(87) PCT Pub. No.: WO2006/097357

PCT Pub. Date: Sep. 21, 2006

(65) Prior Publication Data

US 2008/0281553 A1    Nov. 13, 2008

(30) Foreign Application Priority Data

Mar. 18, 2005   (DE) .................. 10 2005 013 225

(51) Int. Cl.
*G01C 17/00* (2006.01)
(52) U.S. Cl. ..................................... 702/150
(58) Field of Classification Search ............... 702/94, 702/95, 97, 150–154, 158, 159, 188, 189; 700/302; 701/213, 214
See application file for complete search history.

(56) References Cited

U.S. PATENT DOCUMENTS 5,363,297 A    11/1994   Larson et al.
2003/0179294 A1   9/2003   Martins
(Continued)

FOREIGN PATENT DOCUMENTS
EP         1113669 A2    7/2001
(Continued)

OTHER PUBLICATIONS

Thomas Bebie and Hanspeter Bieri; SoccerMan-Reconstructing Soccer Games from Video Sequences; Oct. 4, 1998; International Conference on Image Processing, Proceedings; pp. 898-902; IEEE, Chicago, IL.
(Continued)

*Primary Examiner*—Michael P Nghiem
(74) *Attorney, Agent, or Firm*—Hahn Loeser & Parks, LLP; John J. Cunniff

(57) ABSTRACT

A situation analysis system for detecting and tracking moving objects within a limited space over a predetermined time period and for analyzing object combinations and episodes in relation to time as well as situations during the period of time, includes at least one tracking unit which has at least one sub-unit which is arranged and oriented to detect the limited space and moving and stationary objects disposed therein, and a central position data processing unit which for each real object determines a global position of the object in the detected space and generates a global object identification and an associated time-dependent global position data set. Each tracking unit has a data transmission unit connected to the central position data processing unit and allows bidirectional communication so that the central position data processing unit can simultaneously transmit data to each at least one tracking unit.

10 Claims, 7 Drawing Sheets

U.S. PATENT DOCUMENTS

| | | | |
|---|---|---|---|
| 2005/0117778 A1* | 6/2005 | Crabtree | 382/103 |
| 2005/0270156 A1* | 12/2005 | Ravet | 340/572.1 |
| 2008/0267451 A1* | 10/2008 | Karazi | 382/103 |

FOREIGN PATENT DOCUMENTS

| | | |
|---|---|---|
| FR | 2 726 370 A1 | 10/1994 |
| GB | 2387052 A | 10/2003 |
| WO | 02/071334 A2 | 9/2002 |

OTHER PUBLICATIONS

James Davis and Xing Chen; Mixed Scale Motion Recovery Using Guidable Cameras; Stanford Computer Science Technical Report; Dec. 2000; pp. 1-7; Stanford University, U.S.A.

Janez Pers, Marta Bon, Stanislav Kovacic, Marko Sibila and Branko Dezman; Observation and analysis of large-scale human motion; Human Movement Science; vol. 21, Issue 2; Jul. 2002; pp. 295-311.

Ming Xu et al.; Architecture and Algorithms for Tracking Football Players with Multiple Cameras, Feb. 23, 2004.

Derwent Translation of French Patent No. 94 13144; Real-time determination system for ball and players position on sport pitch—has tracking system to calculate coordinates of ball and players which are analysed by processor to provide various game information, 1994.

\* cited by examiner

OBJECT-TRACKING AND SITUATION-ANALYSIS SYSTEM

BACKGROUND OF THE INVENTION

The invention concerns a system for object tracking and situation analysis for dynamic processes with moving objects in a limited space, for example for detecting and tracking players and a ball during a game of soccer and for analyzing various game situations. The moving objects are then the players and the ball. The limited space is the soccer field.

SUMMARY OF THE INVENTION

The idea of the invention is in no way only limited to detecting soccer games on a soccer field. It can also be applied to detecting any ball games or other processes involving movement, with a plurality of moving objects. Detection can equally little take place in any limited space and is thus not limited to detection on a playing field.

The system operates in real time in order to continuously provide analysis results and graphic representations in parallel relationship with events in the game. In that case the events in the game are detected at least 12 times per second, preferably 25 times per second, and analyzed, so that the analysis results are continuously updated at a frequency comparable to the perception speed of the human eye. By virtue of the distributed implementation of the system the analysis results are afforded with a low level of latency which is generally no greater than the time interval between two successive detection moments; it can however also be greater than the time interval between two successive detection and analysis moments. In preferred embodiments the latency is constant for each detection moment but in any case it is less than a fixable maximum.

The system includes one or more tracking units which are adapted to detect objects and to ascertain the spatial components of the detected objects and which are connected to a central position data processing unit. In each of the tracking units used, one can be used for the selection of measurement methods for determining the spatial co-ordinates. Thus, in a design configuration of a tracking unit, it is provided that the objects to be detected (ball, referee, players) are provided with sensors which make it possible to determine the whereabouts in question insofar as they themselves emit signals or appropriately react to an emitted measurement signal. The determining operation itself can then be effected by sonar waves or electromagnetic signals, for example on the basis of transit time detection or the Doppler effect. The tracking unit itself is then possibly divided into two or more sub-units which are distributed at various positions around and over the playing field and which receive and evaluate the signals emitted by the sensors.

Each tracking unit has at least one object detection unit. If a tracking unit has a plurality of sub-units then preferably each sub-unit has its own object detection unit. In that case the tracking unit can have a local object detection central station which provides for further processing of the data sets produced by the object detection units of the individual sub-units and concerning a detected object, and communicates with the central position data processing unit. If the situation analysis system has only one tracking unit, no local object detection central station is provided; in that case the central position data processing unit performs the functions of the local object detection central station.

The object detection units are adapted to associate the raw measurement data which occur upon detection of the objects, with individual objects. In that case, no identification of the individual objects yet takes place within the object detection units if, with the measurement method used, the identity of the respective object is not established from the outset, by virtue of the placement of a sensor. In other words, each tracking unit considered in itself associates with each object detected thereby, a local identification which can differ from the identification associated with the same object by another tracking unit of the detection system. All detected data sets are stored in a central system data bank over the entire duration of the game so that they are also available for subsequent reconstruction and analysis of all moves in the game. The central system data bank also includes a priori knowledge, for example concerning the weight or the height of players or player associations or data detected during the detection of another game by the situation analysis system. The system data bank is thus a game-superventional data bank, the content of which is continuously developed and updated during use of the system insofar as the data obtained during operation such as information relating to the number of corners, shots on goal, accurate or misdirected passes, fouls and so forth flow back into the system data bank. In addition, the database of the system data bank can also be expanded outside operation. Thus, for example items of information concerning the players or organizations such as team memberships, brief biographies of the players, number of appearances in the respective national team, state of health and readiness to play, playing suspensions etc can be put into the system data bank.

Depending on the respective measurement method used, a tracking unit (by means of its object detection unit) can associate a plurality of local identifications with one and the same object in the course of the monitoring period. That happens whenever an object leaves the part of the playing field detected by the respective tracking unit and returns thereto insofar as the measurement method used does not automatically permit identification of the detected object by the sensor used. During a detection period (duration of a game) the same identification is not allocated by a tracking unit a second time.

The object detection unit of each tracking unit respectively associates with an object detected at a detection moment $t_{n+1}$, the identification of an object detected at the last identification moment $t_n$, prior to that moment (presumably the same object), whenever the spatial distance of the position co-ordinates of the object detected at the two detection moments does not exceed a given threshold value, that is to say the detected object, within the time difference between the two detection moments, has moved at most a given distance.

The threshold value can be predetermined depending on the respective kind of object (a ball will usually move faster than a player) and can be altered adaptively by an algorithm during detection. Thus the threshold value can be lowered if the detected object (a player) last moved slowly or more slowly, and increased if the detected object last became faster and faster.

The spacing of the position co-ordinates which resulted in a positive association of the same local identification with an object detected at two successive identification moments is preferably noted in the data set identifying the new position of the detected object, preferably in the form of a vector.

Objects which do not belong to the game can already be excluded from further processing in the step of associating the local identifications, by a procedure whereby given rules for the motion properties of players and ball are checked. Thus a total standstill of a detected object cannot be a person or a ball which is in play (at least as long as the game has not been interrupted). Likewise an object moving at high speed cannot be a player or an object which is moving at high speed and the movement of which does not comply with the ballistic rules for a kicked or thrown ball cannot in any way be an object related to the game.

Each tracking unit communicates the spatial co-ordinates associated with a local identification—optionally after projection has already been effected into a global co-ordinate system—continuously to the central position data processing unit which respectively associates the data sets obtained from the various tracking units with the real objects. As each tracking unit usually only detects some of the objects, but many objects are inevitably detected simultaneously by a plurality of tracking units, there can be a different number of data sets with spatial co-ordinates, in relation to each real object. In addition, there is the fact that the central position data processing unit is adapted to reject those data sets which are not to be associated with any object in the game, but which are attributed to an object which is outside the game and which has passed into the detection region of a tracking unit.

A particularly preferred form of a tracking unit includes a camera which is so designed and arranged that it detects at least a part of the playing field. If a plurality of tracking units of that kind are used the cameras are advantageously so arranged that together they detect the entire playing field from different viewing angles.

The cameras each include a respective objective, an image detection sensor, for example a CCD sensor or a CMOS sensor, a frame grabber unit and an object recognition unit.

The object recognition unit of each camera is adapted to isolate in per se known manner individual objects in images which are detected by the image detection sensor and pre-processed by the frame grabber unit, for example by means of a keying process such as chroma key, difference key, luminance key or edge detection.

For each isolated object, at least one position data set characterising the position of the object in the respective detected two-dimensional image is created. All co-ordinates, that is to say all position data sets, of the objects isolated by a camera are ready at a data output of the respective camera for transmission to a central position data processing unit. In a variant of the invention an identification can be associated with each position data set associated with a respective object.

The object recognition unit can also be designed in such a way that no identification is generated and the position data set associated with each isolated object for the moment of image recording does not include any identification. In that case an identification is automatically produced in the position data processing unit.

The camera of each camera-based tracking unit is calibrated in a two-stage calibration process. During the first stage the imaging properties of each camera are ascertained and a first calibration data set is produced, which allows reduction by calculation of the errors produced by the imaging properties of the camera in position detection. In that step in objective calibration, a flat calibration body is moved into the detection field of the camera. Preferably, a rectangular calibration body is employed. On its surface the calibration body is provided with a lattice mesh which is set off in optically contrasting relationship with respect to brightness or color of the calibration body and the mesh honeycombs of which are preferably of a square or at least rectangular configuration and the edge lengths of which are known. Instead of a lattice mesh, it is also possible to use a calibration body with a checkered color pattern.

By the calibration body being positioned and recorded in various positions with respect to the camera, geometrical calibration data which allow calculation of the imaging distortion of the camera are provided on the basis of the edge configurations and the intersection points of the mesh, because the actual geometry of the calibration body is well-known. In that fashion the following camera and object parameters are calibrated:

aperture angle or image distance,
horizontal scaling factor,
image center point (optical axis-CCD center point displacement), and
radial distortion.

During the second stage in the calibration process positional calibration of the sensor cameras is effected. For that purpose, the cameras are moved to the position which they are to adopt during the detection of a soccer game to be detected. The positions are to be so selected that each point on the playing field is detected by at least two cameras, the optical axes of which as far as possible form an angle of between 45° and 135°.

For the calibration operation, at least one calibration body which contrasts in relation to the playing field is now put on to the playing field. The calibration body, as far as possible, is spherical so that its contour which is detected from any position is always circular or elliptical. The size of the calibration body is to be so selected that the calibration body in the imaging by each measurement camera occupies at least a plurality of pixels which is preferably of the order of magnitude of between ten and a hundred pixels. The size of the calibration body is consequently also dependent on the resolution of the measurement cameras. Preferably the resolution of the measurement cameras is to be so selected that a calibration body of a size corresponding to the given rule is smaller than a soccer ball in order to allow calibration which is sufficiently accurate to accurately determine the position of a real object except for a distance which is smaller than the diameter of a soccer ball.

The calibration body is positioned at various positions on the playing field and detected by the measurement cameras. That makes it possible to determine the relative positions of the measurement cameras with respect to each other. When the calibration body is positioned at various known positions on the playing field (for example at the kick off center spot, at the penalty spots, corner spots and the intersections of the playing field markings), the absolute position of the measurement cameras can also be determined in a global co-ordinate system whereby calibration is concluded.

Each tracking unit has a data transmission unit, by way of which it can be connected to the central position data processing unit. Preferably, the data transmission unit is adapted to allow bidirectional communication so that both each tracking unit can simultaneously transmit data to the central position data processing unit and the central position data processing unit can simultaneously transmit data to each tracking unit individually or a plurality of tracking units by way of a backward channel.

In order to keep down the demands in terms of computing capacity of the central position data processing unit, the object recognition unit of each camera of a camera-based tracking unit can already implement processing steps for the image data obtained thereby and communicate only the results to the central position data processing unit. Alternatively, each camera can also communicate raw image data besides the results of processing steps which have already been carried out, on the basis of which the central position data processing unit can perform additional processing steps.

The backward channel allows control of the detection performance of the tracking units. Thus a tracking unit can be instructed no longer to track an object with a given local identification as it has been recognised in the central position data processing that this is not an object related to the game or because a different tracking unit is at the present time supplying more exact measurement data by virtue of better positioning, in relation to the same real object. It is also provided that in the case of camera-based tracking units the parameters for the different keying algorithms used are predetermined variably over the progress of the game, by way of the backward channel. In that way, a tracking unit or a sub-unit of a tracking unit can be, for example, instructed to preferably isolate image objects of a given color, brightness and so forth and in relation to those image objects to produce position data sets or to isolate by image technology a given object with the simultaneous application of a given combination of keying processes, in which case the criteria to be applied in application of the keying processes can also be predetermined by way of the backward channel. In that case, the criteria can be selected and predetermined automatically or by an operator monitoring correct functioning of the system.

The analysis module can anticipate particular game situations on the basis of detected positions and from a comparison of positions of deduced directions and speeds of movement on the basis of rules concerning the rules of the game and other game-related laws. Those rules and laws can be contained in the system data bank which is connected to the analysis module. Such game situations can be game-specific situations such as an offside position, foul play or the scoring of a goal, and also particular game situations from the viewpoint of the detection procedure such as two players who are running past one behind the other being hidden one behind the other, and so forth.

If the analysis module predicts such a particular game situation with a degree of probability which is great in relation to a selectable threshold value, the analysis module can already predetermine, prior to the occurrence of the particular game situation, operating parameters which are adapted to the anticipated game situation for the tracking units by way of the backward channel so that detection and analysis can be implemented at an increased speed or with a higher level of certainty of success. The operating parameters which are automatically predetermined in that way by the analysis module by way of the backward channel, depending on the respective configuration of the tracking unit in question, can be for example criteria for the keying processes to be used or the position and resolution of that image portion in which the occurrence of the particular game situation is expected.

In principle, it is possible to use a combination of keying processes for isolating an object by image technology. The data structure identifying an object detected in that way provides a number of fields corresponding to the number of keying processes which are or which can be used, wherein stored in the fields is a value which specifies the frequency of those pixels of the object which satisfy the predetermined criterion for the respective keying process. The data structure also provides room for expansions which are provided for the results of other image processing processes or non-image-based detection processes.

Whenever automatic association of the data sets with a real object, that is to say, the production of a global object identification and a global object data set and the association with a real object, is not possible, the association can be effected manually by an operator. For that purpose the central position data processing unit is preferably connected with a user interface to an image display device and preferably already provides a selection of possible real objects which can be associated with the respective dubious object. That predetermined selection is preferably based on the previous association of real and global objects, as was involved prior to the moment in time from which the association could no longer be uniquely automatically effected. In that respect, consideration is preferably taken of the fact that only those objects which, prior to the association which can no longer be implemented automatically, involved a certain maximum positional distance relative to the object or objects which cannot be associated, are possible for an association. If the operator implements an association, the central position data processing unit is designed to suitably adapt the real objects which are available for selection for association for other dubious objects. If there is only one possible object association remaining for a given dubious object, the central position data processing unit automatically implements the association.

A scenario, by way of example, for the situation discussed involves two players who collide so that separation by image technology is no longer possible at the moment of the collision. After the players have moved away from each other, automatic association of the image objects which are now separately detected again and which respectively represent one of the players or a part of the player is under some circumstances no longer possible so that the central position data processing unit indicates for each player the two names, the numbers on their backs or other symbols in respect of the players who collided, as a possible object association. If the association is effected manually for the first of the two players the central position data processing unit automatically associates the remaining object identification with the other player. Basically however, the described situation can be resolved in most cases for example by predetermining or automatically selecting suitable parameters (criteria) for a keying process so that, for example, the color of the jersey of the respective players in question is used as an assessment criterion.

As errors can occur both in automatic association and also in manual association, association is effected by producing official object data sets with a respective official object identification. The global object data sets produced by virtue of the local object data sets being brought together to afford a global object are basically retained and are stored in the system data bank so that the official object identifications and data sets which are generated on the basis of an erroneous association of the global object data sets with real objects can be later replaced by corrected ones.

In a particularly preferred feature, images of a first high resolution are obtained by the cameras of a camera-based tracking unit and converted into images of a second lower resolution. In that case, the cameras have a buffer memory which continuously holds in readiness a number, determined by the selected size of the memory, of last-recorded images involving a high resolution (see FIG. 4, for example).

The low-resolution images are continuously transmitted to the central position data processing unit, possibly as well as items of information relating to objects isolated by image technology. Whenever, in that case, the central position data processing unit cannot perform the following processing steps with sufficient accuracy or can only perform them faultily, it requests from one or more cameras by way of the backward channel to the cameras the corresponding images of higher resolution, which are stored in the buffer memory, in order to effect the respective processing step with the images which are richer in detail, which affords a higher degree of probability of successfully performing the processing step. The images which are richer in detail are preferably not obtained by adaptation of the focal length and thus optical magnification but are based on the images originally detected in a first higher resolution. Alternatively, it is also possible to use images which are richer in detail and which were obtained by a magnified optical imaging procedure, for the detection of anticipated particular game situations. For that purpose additional cameras with a higher degree of optical magnification are preferably used for detection.

The central position data processing unit can request, by way of the backward channel, either the complete images involving the higher level of resolution or however, only that portion or those portions of the image, within which the processing steps to be performed could not be successfully performed.

The system thus comprises three components which are clearly delimited from each other, namely:
a tracking module,
an analysis module, and
a visualisation module.

The tracking module includes at least one tracking unit. Camera-based tracking units are preferred; they can be used besides sensor-based tracking units. A particularly suitable tracking module has at least two and preferably at least four measurement cameras which hereinafter are optionally also referred to as (digital) tracking cameras (DTC). They are arranged and oriented in such a way that they can detect the limited space and the moving and stationary objects therein, from different perspectives. The measurement cameras each have an objective, an image sensor, a frame grabber unit and an image processing unit which are so arranged and designed that the objective of a respective measurement camera projects a two-dimensional image of the detected space and the objects on to the image sensor of that measurement camera. The image sensor is in turn connected to the frame grabber unit of the measurement camera for pre-processing of the image detected by the image sensor. The image processing unit of the measurement camera receives image data from the frame grabber unit and is adapted, in the respective two-dimensional image, to detect individual objects and the position thereof within the two-dimensional image by means of a keying process and to produce a camera-specific position data set for each detected object at the respective time. Each position data set can additionally contain an individual object identification for each object as well as the camera-specific position data registered for that object at the respective time (see FIG. 6).

Alternatively, it is also possible for the position data in respect of the objects to be passed in the form of position data sets without object identification to a central position data processing unit and for no individual object identifications to be produced in the cameras.

In addition, the tracking module includes a central position data processing unit (hereinafter also referred to as the position data processor) which is connected to the measurement cameras to receive the camera-specific position data sets and which is adapted to associate the respective object identifications originating from the individual measurement cameras with each other in such a way that all object identifications are associated with a respective real object. In addition, the central position data processing unit is adapted to determine a global position from the camera-specific position data of the camera-specific position data sets in relation to a respective real object, for the respective real object in the detected space, preferably by triangulation, and to produce for each real object a global object identification and an associated time-dependent global position data set.

Triangulation is based on geometrical position detection of a point or object from at least two different standpoints without specific detection of the distance in relation to the detected point or object, by measurement technology. The process which is well-known in the state of the art is based on solving a linear equation system. The detected point in the three-dimensional space is present by virtue of the detection from two different standpoints in each case as two-dimensional co-ordinates in the two local co-ordinate systems. By virtue of calibration of the measurement cameras, it is possible for the two-dimensional co-ordinates to be converted into global co-ordinates, which corresponds to co-ordinate transformation from an angle-based two-dimensional co-ordinate system into $R^3$. The two-dimensional co-ordinates then represent for each standpoint a respective straight line which passes through the detected point. The point of intersection of the two straight lines then supplies the three-dimensional co-ordinates of the detected point.

Alternatively, it is also possible for the position data processing unit to receive from the tracking cameras position data sets without a respective object identification. The position data sets provided for each time window on the part of the tracking cameras then only contain object co-ordinates without an object identification which associates those co-ordinates with an object. De facto, that signifies that the tracking cameras do not have any tracking function and the association of co-ordinates supplied on the part of the cameras in the form of position data sets with individual objects such as for example individual players or a ball is effected exclusively in the central position data processing unit.

In that alternative embodiment of the object recognition unit, the position data processor must manage without camera-specific object identifications or object identifications which are already global, in the association of the camera-specific position data sets for calculating a global position of a real object. For that purpose, it combines all possible associations of various pixel co-ordinates from a respective camera-specific data set for calculation of the global position of a real object. If that position satisfies the geometrical condition that the heightwise co-ordinate of the position of the object in the terrestrial co-ordinate system corresponds to that of the playing field, that means that the mutually corresponding pixels have been found. That automatic pixel matching procedure is repeated until the corresponding pixel associations have been ascertained for all real objects, and the global positions thereof have been calculated. Global object identifications can now be associated with the real objects automatically or manually (operator) and stored together with the global position data in an associated time-dependent global position data set.

Criteria for tracking—that is to say the association of a position data set for a time window with the position data set of a next time window, which corresponds but which has altered on the basis of player or ball movement—are as follows:
players have base point co-ordinates (Z-co-ordinates) which correspond to the ground of the soccer field, and objects can move only limitedly far by virtue of their maximum speed within a time window.

Tracking rules are derived from those criteria. The central position data processing unit is adapted to associate the position data sets on the basis of those rules from one time window to another with respective individual objects and in that way to implement tracking.

The position data ascertained by the tracking cameras for a respective object can be the co-ordinates of a respective surface centroid or base point of a (two-dimensional) object isolated by keying in the respective (virtual) camera image plane.

By computer-aided combination of all image objects representing still anonymous players—preferably represented by their base points—it is possible by triangulation to associate with each other those objects from various camera images, for which the z-co-ordinate of the playing field is afforded. It is thus known which camera-specific image objects correspond to each other. On the basis of a video control image, the tracking operator can thus associate an identification (global ID) with the object which is successfully tracked in that way.

In that respect the tracking module and in particular the central position data processing unit is adapted to distinguish at least two and preferably three different kinds of objects. Those different objects are on the one hand moving objects which differ in terms of active self-moving objects (for example soccer players) and passive extraneously moved objects (for example, the soccer ball). Selectively, the tracking module also detects non-moving, stationary objects, for example the soccer goal. As the last-mentioned objects however, are stationary, the position and object identification thereof can also be easily stored in a data bank either of the tracking module or the analysis module.

The camera-specific object identifications—if such are produced—and the global object identification for each object—for example, the soccer or a given player—can be identical to each other or can differ from each other. In the former case the object identifications for each virtual image of a real object (ball, player, etc) are globally identical. That is the case in particular when no camera-specific object identifications are allocated but object identifications as global object identifications are first produced in the central position data processing unit.

If camera-specific object identifications are allocated, the association of the camera-specific local object identifications with a respective global object identification can be affected once at the beginning of a detection period, that is to say for example, at the beginning of a soccer game. In the context of that association and identification, the global object identifications can also be manually associated with real objects, that is to say for example the individual players and the ball in a soccer game.

The latter is also the case when exclusively global object identifications are produced centrally. In that case also, the association of the global object identifications with real objects is effected with manual support, for example at the beginning of the game or after interruptions in the game. Starting from a known initial situation, further tracking can then be effected very substantially automatically on the basis of the above-mentioned rules. Manual support of association may also be necessary during the flow of the game only after object overlaps and concealments.

In order to be able to manage without local object identification, that is to say, in order to be able to also use keying modules without object identification allocation in the system for position calculation by means of cameras of detected objects, the pixels which are transmitted by all cameras to the central tracking unit in the form of image co-ordinates therefore have to be associated with each other. That can occur automatically in the central tracking unit by applying the above-mentioned rules, insofar as, out of all possible associations, those are selected which satisfy the geometrical condition that the heightwise co-ordinate of the position of the object in the terrestrial co-ordinate system corresponds to that of the playing field. It will be appreciated that that automatic procedure should be effected for performance reasons only prior to the beginning of a soccer game to initialise the tracking system and in the event of recognised 'disturbances' in the tracking procedure (for example players are concealed one behind the other and then move away from each other again, or a player substitute), to restore the pixel association. Identification of objects which in that way are calculated in their position in the terrestrial co-ordinate system (global object identification) is always effected by the operator shortly before the beginning of the game or if necessary during the game in the above-mentioned disturbance situations.

Preferably the situation analysis system includes a visualization module having a visualization unit which is connected to the analysis module and which is adapted at any time to access the data structures in question and to derive therefrom graphic, time-dependent and dynamic representations of the object positions and combinations and additionally possibly also statistics.

In that respect, the visualization module is adapted to produce an optical reconstruction of the game or a part of the game. In that case, any virtual standpoint within the game can be adopted so that a particularly interesting or contentious scene, for example from the point of view of the referee, a player or from a position for which no original image data are available, can be displayed.

The invention will now be described in greater detail by means of an embodiment by way of example, namely a game analysis system for a soccer game.

DETAILED DESCRIPTION OF THE INVENTION

Figure 1:
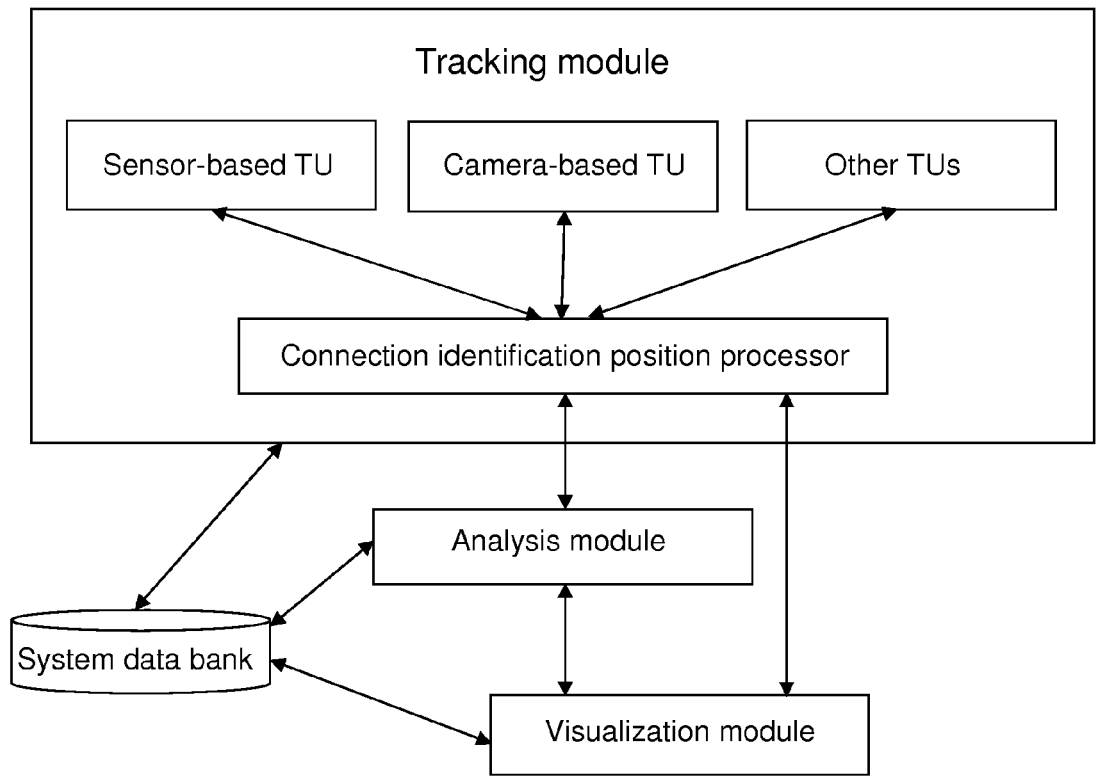
FIG. 1 shows a first overview of a first embodiment of the tracking module.

FIG. 1 shows a first overview of a preferred embodiment of the tracking module. The tracking module includes a plurality of tracking units (TU). The example has a sensor-based tracking unit and a camera-based tracking unit. In addition, the arrangement may have further tracking units, for which reason a place holder can be seen in the block diagram for further tracking units ('other TU').

All tracking units are preferably bidirectionally connected to the connection identification position processor (CIPP). That CIPP includes the central position data processing unit which associates the data sets obtained from the object detection units of the individual tracking units with real objects.

The tracking module is connected to the analysis module, the visualization module and the system data bank. The system data bank is also connected to the analysis module and the visualization module in order to store all data sets produced during detection and to make them available to the system components on demand.

The analysis module communicates, once again preferably bidirectionally, with the visualization module and the connection identification position processor. The visualization module performs the tasks of data-technological reproduction and representation of scenes from the game or other information displays. The reproduction of scenes from the game, generated by the visualization module, can correspond to the optical impression of the scene from the game which is recorded by a virtual camera from a freely selectable, movable standpoint. Although therefore there is only a fixed number of actual cameras, images can be calculated and represented at any time for any viewer position. In that respect, it is possible for a scene from the game to be considered from the viewpoint of a given player, for example the goalkeeper, looking at the ball as it approaches, the referee or one of his assistants or from the point of view of the ball itself. A possible option which is particularly interesting from the point of view of analyses of game tactics is that of producing a plan view of the game, on the basis of which the positioning of each player can be monitored for example in regard to covering the ground.

The visualization module can be connected to a transmitting device (not shown in the drawing) for video images so that the images produced by the visualization module (and possibly sounds) can be incorporated into a transmission or recording of a soccer game.

Figure 2:
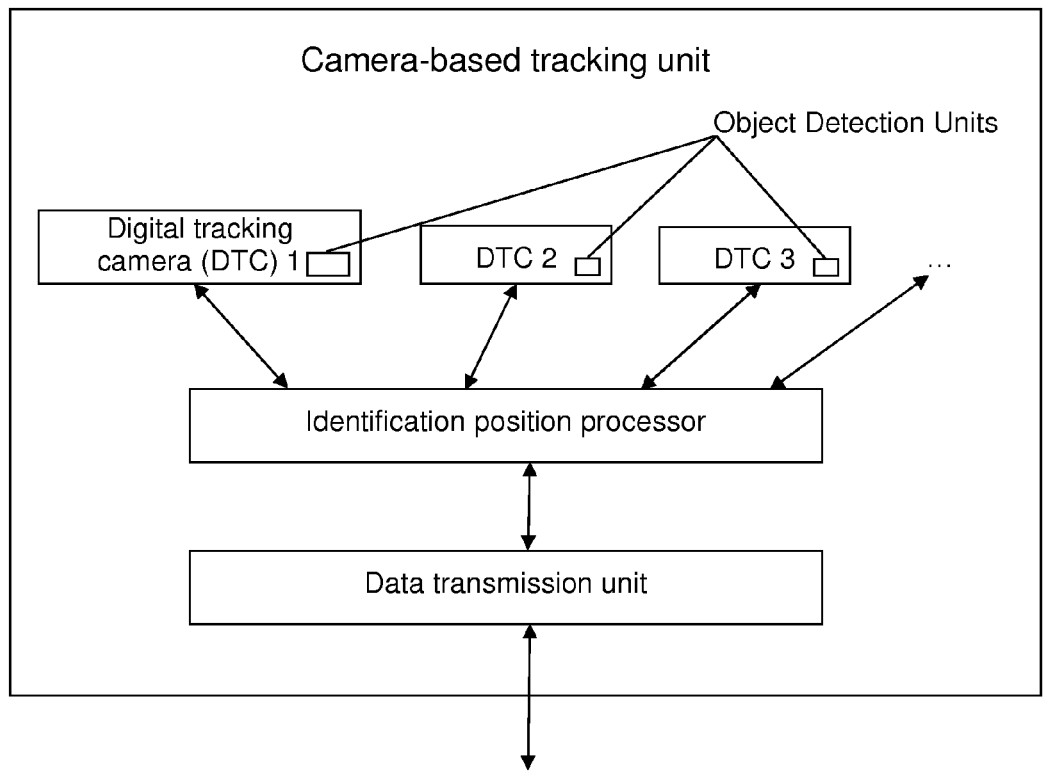
FIG. 2 shows a block diagram of a camera-based tracking unit.

FIG. 2 shows a block diagram of a camera-based tracking unit. The tracking unit has a plurality of sub-units which each include a digital tracking camera (DTC). Three of these are shown in the block diagram. The tracking cameras are connected to the identification position processor which contains the object detection center of the camera-based tracking unit. In addition, each DTC preferably includes its own object detection unit which is not specifically shown in the block diagram. The object detection units are adapted to apply various keying processes to the image data detected by the respective DTC so that image data which can be used for isolation of the detected objects are already available at the inputs of the identification position processor and the latter is relieved of load in terms of computing procedures.

The identification position processor is connected to the data transmission unit of the tracking unit which bidirectionally communicates with the central position data processing unit. As the individual DTCs are distributed at different locations around and above the playing field each DTC also includes a data transmission unit, by way of which it is connected to the identification position processor.

Figure 3:
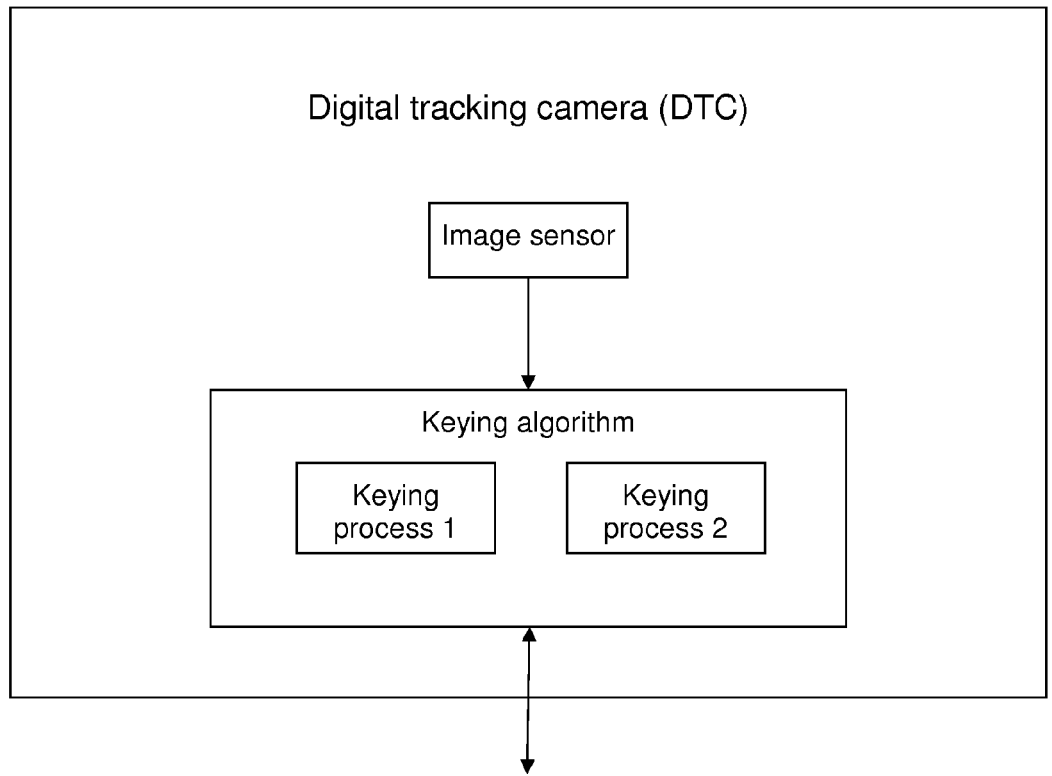
FIG. 3 shows a simplified block diagram of a digital tracking camera (DTC)

FIG. 3 shows a simplified block diagram of a digital tracking camera (DTC). The optical and electronic components for image generation are combined together in the block diagram in a block referred to as 'image sensor'. In principle, that part of the DTC is designed in accordance with a manner known from the state of the art. The images generated by the image sensor are passed unidirectionally to the object detection unit of the DTC. That is adapted to apply the above-mentioned keying processes to the image data and transmit the intermediate result data to the object detection center or the central position data processing unit. In regard to this system structure, the man skilled in the art will weigh up which processing steps are in that case to be executed by the object detection unit of the DTC and which are to be executed by the object detection center. Important aspects in regard to that decision are using the different data processing units to capacity as uniformly as possible and a necessary bandwidth, which is as small as possible, for transmission of the intermediate result data between the individual processing units.

Figure 4:
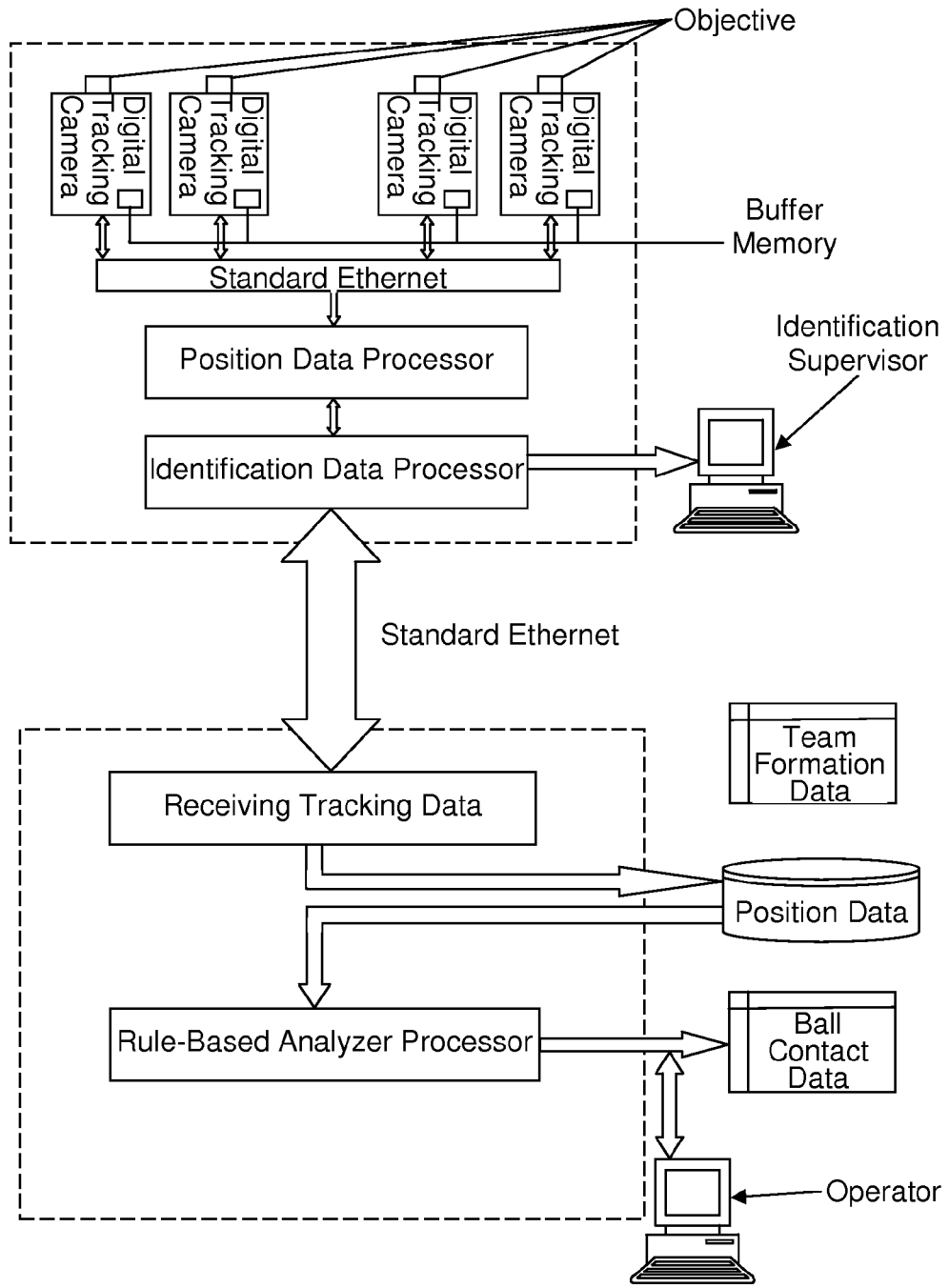
FIG. 4 shows a diagrammatic overview of the tracking module and the analysis module of the described system.

At least four digital and internally calibrated measurement cameras are used as the tracking cameras for detecting all object movements on a playing field (see FIG. 4). They are positioned around the entire area in such a way that overall any position on the playing field can be registered by at least two measurement cameras. The cameras are each equipped with a miniaturized computer which evaluates the camera images in its working memory (extraction of all object contours) and only sends the image position—represented in each case by the centroid or the base point of the object areas ascertained by keying processes—of all extracted objects for further processing by way of a standard network to a central position data processor (central position data processing unit). In the specific embodiment here, the camera images are not permanently stored at any time. Rather, in each case the objects are immediately extracted by contour extraction, that is to say by a keying process (FIG. 3), and the associated position data—preferably the co-ordinates of a base point or a centroid of an isolated two-dimensional object—are ascertained in the respective two-dimensional image space of each camera. The cameras can therefore, be viewed as pure tracking cameras. In an alternative configuration however, it is also possible to provide for storage of the camera images for later assessment. Storage however is not required for analysis and visualization, by virtue of the real time functionality of the system.

To achieve optimum keying results, it is possible to choose between four contour extraction or keying processes which are basically known to the man skilled in the art, namely chroma key, difference key, luminance key or edge detection.

The tracking cameras are to be determined in respect of their position and orientation with respect to a terrestrial co-ordinate system (global co-ordinate system), for each measurement campaign. In that way on the one hand all image co-ordinates (local position data) which are sent in a synchronized condition—at the shortest possible time intervals—by the tracking cameras by way of a network are transformed in the position data processor (central data detection unit) into object positions in that terrestrial co-ordinate system, that is to say global position data (FIG. 4). On the other hand, the reference to a terrestrial co-ordinate system guarantees the possibility of evaluating metric motion properties (for example distances, speeds).

The central position data detection unit (position data processor) receives at short time intervals (in the specific embodiment, with a repetition rate of at least 12 Hz, preferably 25 Hz), in synchronized condition, from all tracking cameras, the image co-ordinates of the respectively registered objects in the form of local position data sets including associated local object identification. The central position data detection unit (FIG. 4) calculates therefrom for all objects their positions in space. For that purpose, an object identification processor takes over those position data and implements an identification of the objects—including an association of the respective local object identifications with the corresponding global object identification—based on the results obtained in the immediately preceding tracking cycles. The position and identity data (corresponding to the global position data sets besides respectively associated global identification as identification information) are permanently displayed on a display so that a monitoring person as the operator or identification supervisor can possibly implement manual corrections. If object concealments or overlaps or the like should occur, the operator has to intervene and manually perform the association. In doing that, he is as far as possible substantially assisted by system functions (for example preselection on the basis of spatial proximity).

Figure 5:
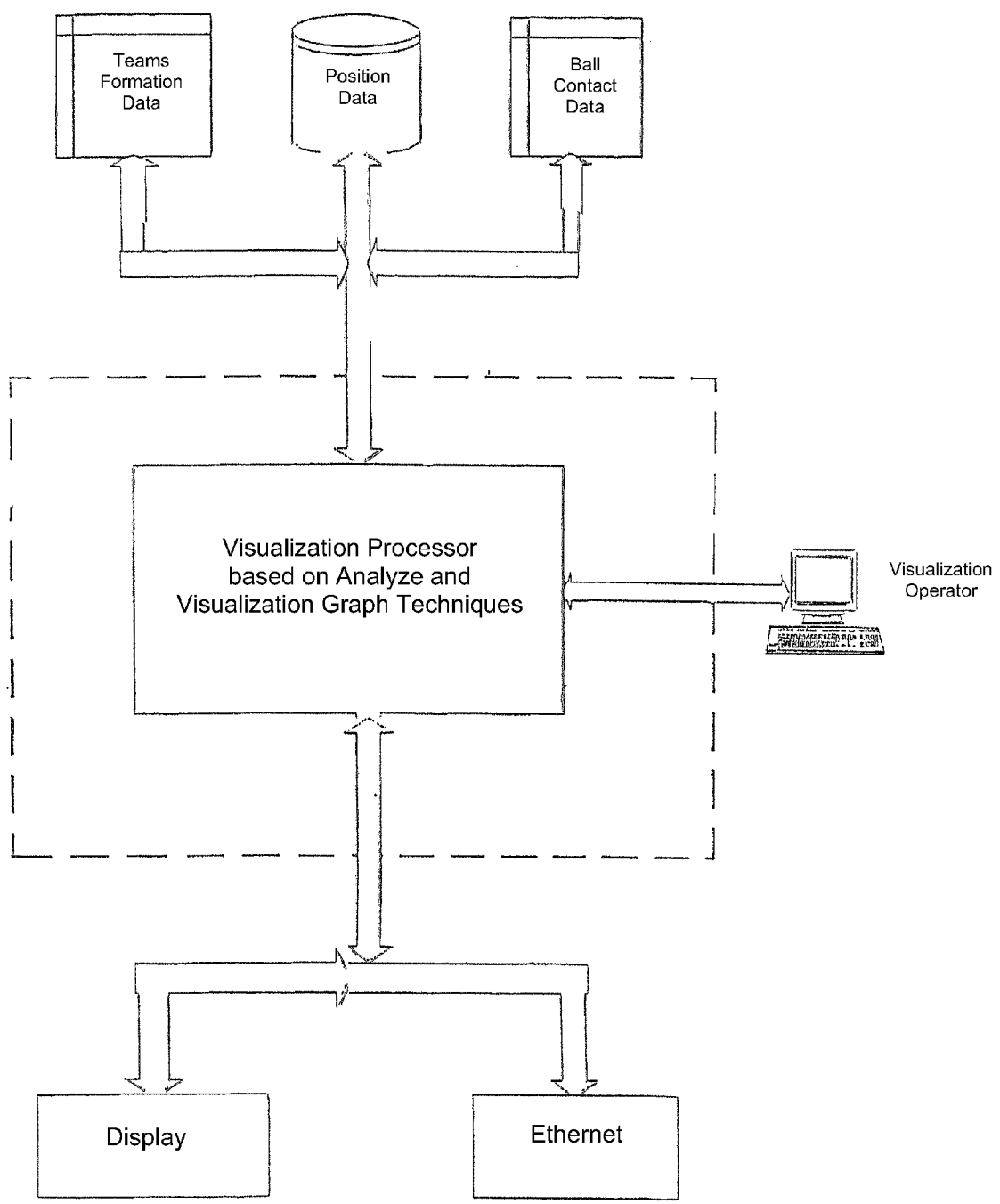
FIG. 5 shows a diagrammatic overview of a visualization module of the described system, which is to be connected downstream of the analysis module of FIG. 4.
Figure 6:
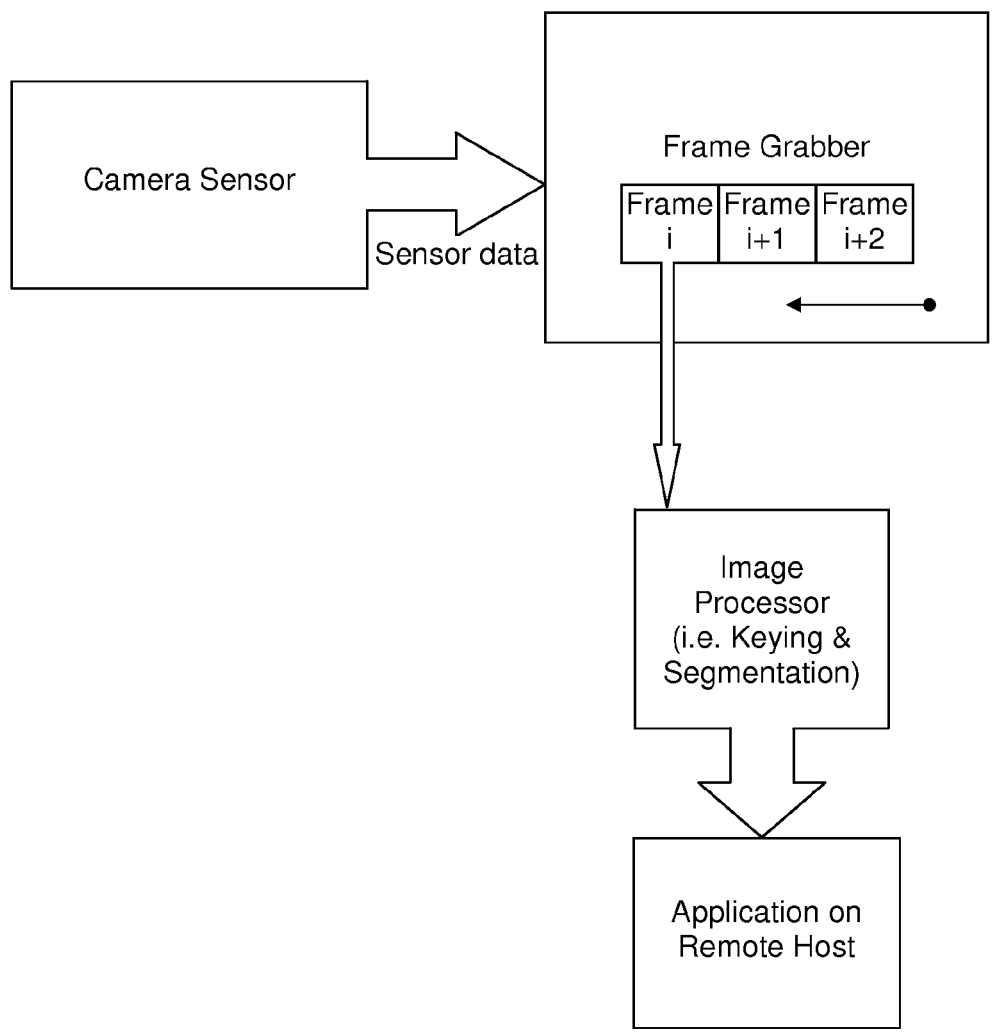
FIG. 6 shows a diagrammatic block view of the components of a measurement camera (tracking camera)

The position and identity data (position data sets and object identifications) are transferred to the analysis module in the rhythm of the tracking system by way of a standard network. There, those data are accumulated both in data structures and also on a mass storage device. Simultaneously therewith, a rule-based analysis processor of the analysis module evaluates the position and identity data which are present in the form of global position data sets and a respectively associated object identification as soon as a new respective entry has occurred in the position data bank and builds up a data structure 'ball contacts' which describes who was in possession of the ball and when and where. By modelling of 'artificial' possessors of the ball such as goal, goalposts, goal, touchline etc all relevant game events can be detected and stored in a unitary form. The rules used for analysis are based on the correlated query of the ball and player positions and the changes therein in comparison with the preceding cycles. In addition, the system provides for knowledge-based analysis on the basis of rules, which takes account of game theory and probabilities for given game events and occurrences on the basis of previously detected or inputted reference states and empirical values. Automatically analysed ball contacts are displayed on a display to a person serving for analysis monitoring (analysis supervisor). The analysis supervisor can correct wrong interpretations by suitable interaction means afforded by the system (FIG. 5).

The data structure ball contacts comprises a list of data sets which are respectively linked to their adjacent data sets. The individual data sets include the following elements:

| Player ID | TimeStamp 1 (start of ball possession) | TimeStamp 2 (end of ball possession) | Player position at TimeStamp 1 | Player position at TimeStamp 2 | Game status flag |
| --- | --- | --- | --- | --- | --- |

Figure 7:
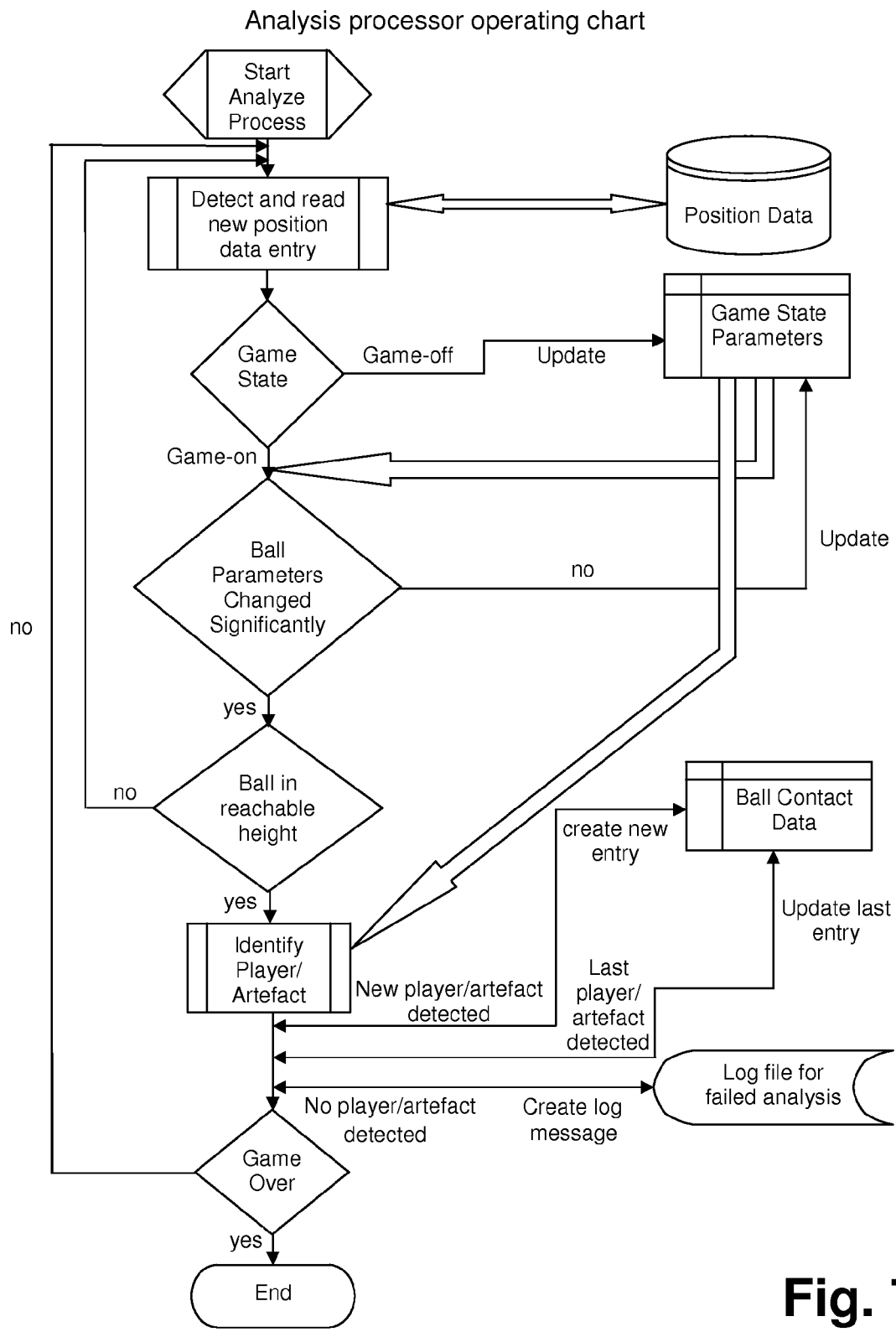
FIG. 7 shows a flow chart to illustrate the mode of operation of the analysis module or the analysis processor thereof.

Upon the entry of a new data set in the position data bank the analysis processor acquires from the operating system control over program execution whereupon it can immediately evaluate the changed game situation (see the flow chart; FIG. 7). As the analysis processor is rule-based, it operates on the basis of a previously stored set of analysis rules which predetermine processing of the position and identification data by the analysis processor.

To apply the analysis rules, it is necessary to describe the state of the game and in particular the ball by means of a game state data structure under program control. That data structure involves the following entries:

| Player ID of last ball possession | Ball possession state (yes\|no) | Game state (active\|not active) | Current 3D-vector of ball movement | Current speed of ball movement |
| --- | --- | --- | --- | --- |

The following rules are canonically applied for ball possession analysis:

Is the game interrupted? if no ->
   have ball movement vector or ball speed significantly changed?
   If yes ->
      is the ball at a height which can be reached by a player or
      which is correct for an artefact? If yes
         which player or which artefact is closest to the ball, in
         which respect a fixed minimum spacing ('least proximity')
         must be observed? If found ->
            has that player or that artefact already been in
            possession of the ball?

The following particular operations in analysis logic (that is to say of the analysis processor) are to be carried out in the situations listed below:

If the game is interrupted, the game state data structure is to be set as follows:

| Player ID of last ball possession = NONE | Ball possession state (yes\|no) = NO | Game state (active\|not active) = NOT ACTIVE | Current 3D-vector of ball movement = actual value, if available, undefined otherwise | Current speed of ball movement = actual value, if available, undefined otherwise |
| --- | --- | --- | --- | --- |

If the currently recognized player who has the ball is identical to the last-registered player with the ball, a fresh data set is not introduced into the ball contact data structure but the 'TimeStamp 2'-element and the corresponding 'player position' element of the last entry are updated. Corresponding calculations are also performed for possible ball contacts and tactical variants are calculated therefrom.

On the basis of the data structures produced in that way for time-related position and identification data on the one hand and for time-related ball contact information on the other hand, calculations are carried out in respect of simple statistics as far as complex analysis procedures on a game-theory basis:

The data structure for time-related position and identification data serves in that case as the basis for calculation of the 'game without ball' both retrospectively and also anticipatorily. Subject-matter of the analysis is in a rising level of complexity for example:

travel distances, speed and acceleration of a player,
   spaces where a player is and radii of action of a player and the team,
   formation play of the teams,
   space coverage, and
   combinational analysis and theory.

The data structure for time-related ball contact data serve correspondingly as a basis for calculation of the 'game with the ball'. Subject-matter of the analysis is in a rising level of complexity for example:

number and type of misdirected passes (in the short-passing game or in the case of 'long balls', in attack, midfield or in defense),
   preferred start-of-play stations and double-pass (referred to as 'one-two' pass) players,
   proportion of long and short passing game,
   sharpness of passing,
   behaviour in one-to-one situations of a player,
   time duration involved and amount of ground gained with a string of passes, and
   the way in which the game flows and information about interrelated game ploys.

Combined assessment of both data structures is used in the analysis of attack and shot-at-goal scenarios as well as counterattack situations. Those data structures are also involved in the calculation of the tactical team game and the change thereto in the course of the game.

By means of time parametrization of the reference states of a game, it is possible to extrapolate recognized game situations into the immediate future and thus anticipate game ploys which promise to be successful. That functionality can be used both in training offline and also during a game online (in real time).

Subject-matter of the game anticipation is in a rising level of complexity for example:
optimum start-of-play station and string of passes,
counterattack risk or possibility,
goal in danger or a goal being scored,
preventing an attack, and
offside trap.

In addition the formation-related and team-related analyses are compared to corresponding reference states—calculated by algorithm or explicitly represented—in respect of the respective game situations, from which it is possible to determine the actual implementation of a tactic from game theory.

For further assessment of the position and identity data and the ball contacts derived therefrom, a visualization module is provided. It has a visualization unit by way of which the visualization module can at any time access the data structures in question. A team formation database initialized at the beginning of the game and possibly updated during the game is also available in structuring relationship for the assessment operation.

A visualization processor of the visualization module performs the analysis calculations and animation commands which are specified by way of a highly flexible tool which is quick to be operated: an analysis and visualization graph which makes it possible to establish the nature and sequence of the desired calculation and representation operations by constructing a network of data processing nodes.

Nodes are characterized in that they process the data at their 'input' in accordance with their function and provide the results at their 'output' for the next node. Thus for example, the node 'preferred start-of-play stations' expects as its input the name of a player and the time interval to be evaluated. The result, a ranking list with names and passes made, can serve for a numerical filter as input datum which establishes how many players on the list should be taken into account for the graphic output. The analysis data established in that way can be passed to a further graphic charts filter which establishes the form in which the statistics are to be displayed (bar charts, pie charts, etc). Visualization can also be effected on the basis of other, for example conventional linear, algorithms.

In more complex dynamic visualizations for example, the speeds of players can be calculated. For that purpose the node relating to speed calculation is activated and on the input side fed with the data relating to player IDs and a time interval to be evaluated.

The invention is further characterized in that both the movement data obtained from object tracking and also the statistical and structure data derived by analysis thereof are represented immediately in dynamic graphs by means of a real time visualization component. Thus in the case of using the system with a team sport, besides pure representation of the positions in space of the players, informative visualization of the immediate play 'on the ball' and the tactical team game is also achieved. In addition upcoming game situations are intuitively and dramatically attractively implemented by the real time animation on the basis of analysis results of the prediction.

The visualization component, both for the integrated representation of analysis results and video images and also for sole use of the visualization module, provides control options in regard to the hierarchical arrangement of the individual image sources or the created graphic elements, in respect of foreground and background. They are also embodied as operations (represented by nodes) in the visualization graph.

The analysis animation or statistics graph resulting from evaluation by the visualization module can be locally displayed at a display and/or transmitted in an established protocol by way of a network to a remote display server which transforms the animation into a video signal.

For integration of the visualizations of the analysis results into a TV live transmission or other video or printed images, the two image sequences—namely, the actual video recording and that produced by the visualization module—are geometrically and temporally synchronized. Geometric and temporal synchronization is also performed for image sequences which are to be called up at a later moment in time.

For geometrical synchronization, both the internal imaging parameters of the video camera (image center point and horizontal scaling factor in dependence on the focal length) and also the position and reference orientation in a terrestrial co-ordinate system are to be determined. In the case of analog video cameras, digitization of the image sequences is necessary for that step. Besides the calibration operation itself, the pass points of the playing field, which are used for that purpose, are also similar to those of the above-described tracking process, whereby it is possible to use a uniform terrestrial co-ordinate system.

For temporal synchronization, the time code registration of the video camera and time detection of the tracking/analysis system are co-ordinated at the beginning of the game or alternatively there is provided a central clock device which predetermines the same time code for all cameras. For integration of the analysis visualizations with image sequences of non-static pivotable cameras, in addition the orientation of those cameras (pivotal angle and angle of inclination) is detected in respect of their change in relation to time and made available to the visualization module. In that way, the visualization module can calculate the analysis results at any moment in time from the perspective of the video camera and feed it in time-synchronous relation to a unit for integration of the image sequences.

We claim:

1. A situation analysis system for detecting and tracking moving objects within a limited space over a predetermined period of time and for analyzing object combinations and episodes in relation to time as well as situations during the period of time, the analysis system comprising:

at least one tracking unit which has at least one sub-unit which is arranged and oriented to detect the limited space and moving and stationary objects disposed therein, and a central position data processing unit which is adapted, in relation to a respective real object, to determine a global position of the respective real object in the detected space and for each real object to generate a global object identification and an associated time-dependent global position data set, wherein, each at least one tracking unit has at least one data transmission unit, by way of which each tracking unit is connected to the central position data processing unit and which is adapted to allow bidirectional communication so that each tracking unit can communicate data to the central position data processing unit and the central position data processing unit can simultaneously transmit data by way of a backward channel to each at least one tracking unit, wherein at least one tracking unit of the situation analysis system has at least one sensor placed at one of the objects to be detected and is adapted to determine the position of the object provided with the sensor by means of sonar waves or electromagnetic signals, wherein at least one tracking unit of the situation analysis system has, as a camera-based tracking unit, at least two sub-units with a respective measurement camera, wherein each measurement camera of the at least two sub-units of the tracking unit is so arranged and oriented that they can detect the limited space and the moving and stationary objects disposed therein from different perspectives and each include an objective, an image sensor, a frame grabber unit and an image processing unit which are so arranged and adapted that the respective objective projects a two-dimensional image of the detected space and the objects on to a respective image sensor which in turn is connected to a respective frame grabber unit for pre-processing of the image detected by the image sensor, wherein the image processing unit takes over image data from the frame grabber unit, and wherein each camera-based tracking unit has at least one object detection unit which is adapted to simultaneously apply at least one keying process to the detected image data in accordance with predetermined criteria which are provided to each of the tracking units by way of the backward channel.

2. A situation analysis system as set forth in claim 1, wherein each measurement camera has a buffer memory which is adapted to store a plurality of the images last recorded by the measurement camera at each moment in time in operation.

3. A situation analysis system as set forth in claim 2, wherein at least one object detection unit of a tracking unit is adapted to detect individual objects in the respective detected two-dimensional image and to detect the position thereof within the two-dimensional image and to generate for each detected object at the respective time a camera-specific position data set with a unique identification which is allocated only a single time during a game and to transmit the position data set to the central position data processing unit, wherein the camera-specific position data set for each object obtains an individual object identification and the camera-specific position data associated with that object at the respective moment in time, and the central position data processing unit is adapted to mutually associate the respective object identifications originating from the individual measurement cameras in such a way that all object identifications in relation to a respective real object are associated with each other, and to determine the global position of the respective real object in the detected space from the camera-specific position data of the camera-specific position data sets and to generate for each real object a global object identification and an associated time-dependent global position data set.

4. A situation analysis system as set forth in claim 3, wherein the analysis module is adapted to derive the direction of movement and the speed of movement on the basis of comparison of already detected positions of objects, and to anticipate particular game situations on the basis of game-related rules and for the detection of said particular game situations to already predetermine prior to the occurrence thereof adapted operating parameters for at least one tracking unit by way of the backward channel.

5. A situation analysis system as set forth in claim 4, additionally comprising a visualization module having a visualization unit which is connected to the analysis module and which is adapted to access data structures provided by the analysis module at any time and to derive therefrom graphic time-dependent dynamic representations of the object positions and combinations.

6. A situation analysis system as set forth in claim 5, wherein the visualization module is adapted to compute by data procedures a virtual graphic representation of a view of at least a part of the game from any selectable in particular movable perspective and to output same.

7. A situation analysis system for detecting and tracking moving objects within a limited space over a predetermined period of time and for analyzing object combinations and episodes in relation to time as well as situations during the period of time, the analysis system comprising:

at least one tracking unit which has at least one sub-unit which is arranged and oriented to detect the limited space and moving and stationary objects disposed therein, and a central position data processing unit which is adapted, in relation to a respective real object, to determine a global position of the respective real object in the detected space and for each real object to generate a global object identification and an associated time-dependent global position data set, wherein, each at least one tracking unit has at least one data transmission unit, by way of which each tracking unit is connected to the central position data processing unit and which is adapted to allow bidirectional communication so that each tracking unit can communicate data to the central position data processing unit and the central position data processing unit can simultaneously transmit data by way of a backward channel to each at least one tracking unit, wherein at least one tracking unit of the situation analysis system has, as a camera-based tracking unit, at least two sub-units with a respective measurement camera, wherein each measurement camera of the sub-units of the tracking unit is so arranged and oriented that they can detect the limited space and the moving and stationary objects disposed therein from different perspectives and each include an objective, an image sensor, a frame grabber unit and an image processing unit which are so arranged and adapted that the respective objective projects a two-dimensional image of the detected space and the objects on to a respective image sensor which in turn is connected to a respective frame grabber unit for pre-processing of the image detected by the image sensor, wherein the image processing unit takes over image data from the frame grabber unit, and wherein each camera-based tracking unit has at least one object detection unit which is adapted to simultaneously apply at least one keying process to the detected image data in accordance with predetermined criteria which are provided to each of the tracking units by way of the backward channel.

8. A situation analysis system as set forth in claim 7, additionally comprising an analysis module, wherein the analysis module is adapted to derive the direction of movement and the speed of movement on the basis of comparison of already detected positions of objects, and to anticipate particular game situations on the basis of game-related rules and for the detection of said particular game situations to already predetermine prior to the occurrence thereof adapted operating parameters for at least one tracking unit by way of the backward channel.

9. A situation analysis system for detecting and tracking moving objects within a limited space over a predetermined period of time and for analyzing object combinations and episodes in relation to time as well as situations during the period of time, the analysis system comprising:

at least one tracking unit which has at least one sub-unit which is arranged and oriented to detect the limited space and moving and stationary objects disposed therein, and a central position data processing unit which is adapted, in relation to a respective real object, to determine a global position of the respective real object in the detected space and for each real object to generate a global object identification and an associated time-dependent global position data set, wherein, each at least one tracking unit has at least one data transmission unit, by way of which each tracking unit is connected to the central position data processing unit and which is adapted to allow bidirectional communication so that each tracking unit can communicate data to the central position data processing unit and the central position data processing unit can simultaneously transmit data by way of a backward channel to each at least one tracking unit, wherein at least one tracking unit of the situation analysis system has, as a camera-based tracking unit, at least two sub-units with a respective measurement camera, wherein each measurement camera of the sub-units of the tracking unit is so arranged and oriented that they can detect the limited space and the moving and stationary objects disposed therein from different perspectives and each include an objective, an image sensor, a frame grabber unit and an image processing unit which are so arranged and adapted that the respective objective projects a two-dimensional image of the detected space and the objects on to a respective image sensor which in turn is connected to a respective frame grabber unit for pre-processing of the image detected by the image sensor, wherein the image processing unit takes over image data from the frame grabber unit, and wherein each measurement camera has a buffer memory which is adapted to store a plurality of the images last recorded by the measurement camera at each moment in time in operation, and wherein at least one object detection unit of a tracking unit is adapted to detect individual objects in the respective detected two-dimensional image and to detect the position thereof within the two-dimensional image and to generate for each detected object at the respective time a camera-specific position data set with a unique identification which is allocated only a single time during a game and to transmit the position data set to the central position data processing unit, wherein the camera-specific position data set for each object obtains an individual object identification and the camera-specific position data associated with that object at the respective moment in time, and the central position data processing unit is adapted to mutually associate the respective object identifications originating from the individual measurement cameras in such a way that all object identifications in relation to a respective real object are associated with each other, and to determine the global position of the respective real object in the detected space from the camera-specific position data of the camera-specific position data sets and to generate for each real object a global object identification and an associated time-dependent global position data set.

10. A situation analysis system for detecting and tracking moving objects within a limited space over a predetermined period of time and for analyzing object combinations and episodes in relation to time as well as situations during the period of time, the analysis system comprising:

at least one tracking unit which has at least one sub-unit which is arranged and oriented to detect the limited space and moving and stationary objects disposed therein, and a central position data processing unit which is adapted, in relation to a respective real object, to determine a global position of the respective real object in the detected space and for each real object to generate a global object identification and an associated time-dependent global position data set, wherein, each at least one tracking unit has at least one data transmission unit, by way of which each tracking unit is connected to the central position data processing unit and which is adapted to allow bidirectional communication so that each tracking unit can communicate data to the central position data processing unit and the central position data processing unit can simultaneously transmit data by way of a backward channel to each at least one tracking unit, wherein at least one tracking unit of the situation analysis system has, as a camera-based tracking unit, at least two sub-units with a respective measurement camera, wherein each measurement camera of the sub-units of the tracking unit is so arranged and oriented that they can detect the limited space and the moving and stationary objects disposed therein from different perspectives and each include an objective, an image sensor, a frame grabber unit and an image processing unit which are so arranged and adapted that the respective objective projects a two-dimensional image of the detected space and the objects on to a respective image sensor which in turn is connected to a respective frame grabber unit for pre-processing of the image detected by the image sensor, wherein the image processing unit takes over image data from the frame grabber unit, and additionally comprising an analysis module which on the basis of the global position data sets generated by the central position data processing unit, generates a data structure which includes time and position data which identify those periods of time and locations in relation to individual detected objects at a spatial and temporal distance relative to each other, wherein the spatial and temporal distance does not exceed a predetermined threshold value, and wherein the analysis module is adapted to ascertain in mutually time-dependent relationship the proximity by comparison of a predetermined and stored spacing value as the threshold value, to the spacings of the objects which arise out of the position data relating to the individual objects.

* * * * *